(12) United States Patent
Azulay et al.

(10) Patent No.: US 10,992,658 B2
(45) Date of Patent: Apr. 27, 2021

(54) CLIENT-SIDE NATIVE APPLICATION AND BROWSER IDENTIFICATION FOR SESSION CONTROL IN PROXY SOLUTIONS

(71) Applicant: MICROSOFT TECHNOLOGY LICENSING, LLC, Redmond, WA (US)

(72) Inventors: Itamar Azulay, Mishmar (IL); Yossi Haber, Ganei Tikva (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 282 days.

(21) Appl. No.: 16/252,930

(22) Filed: Jan. 21, 2019

(65) Prior Publication Data

US 2020/0236102 A1 Jul. 23, 2020

(51) Int. Cl.
*H04L 29/06* (2006.01)
*H04L 29/08* (2006.01)

(52) U.S. Cl.
CPC .......... *H04L 63/0815* (2013.01); *H04L 67/02* (2013.01); *H04L 67/146* (2013.01); *H04L 67/28* (2013.01); *H04L 67/32* (2013.01)

(58) Field of Classification Search
CPC ...... H04L 63/0815; H04L 67/02; H04L 67/28
See application file for complete search history.

(56) References Cited

U.S. PATENT DOCUMENTS

2018/0026940 A1* 1/2018 Sastri ................. H04L 41/0813
711/202

\* cited by examiner

*Primary Examiner* — Esther B. Henderson
(74) *Attorney, Agent, or Firm* — Newport IP, LLC; Scott Y. Shigeta

(57) ABSTRACT

Techniques are disclosed for session control of a client-side native application that utilizes a browser for an authentication process. A login request from the browser is received in a proxy service, which scans the request for a URL redirecting back to the native application. The URL is modified to redirect the login request to a policy endpoint to determine if the request is allowed based on policy applied to the native application and browser. If the request is allowed, the policy endpoint restores the URL redirecting to the native application and bypasses the request to resume normal authentication flow. If the request is prohibited, a failure message is sent to the browser. Some implementations may include injection of browser detection code into the browser to determine which variant of the browser is used and sending the browser data regarding the variant to the policy endpoint for consideration in applying policy.

20 Claims, 10 Drawing Sheets

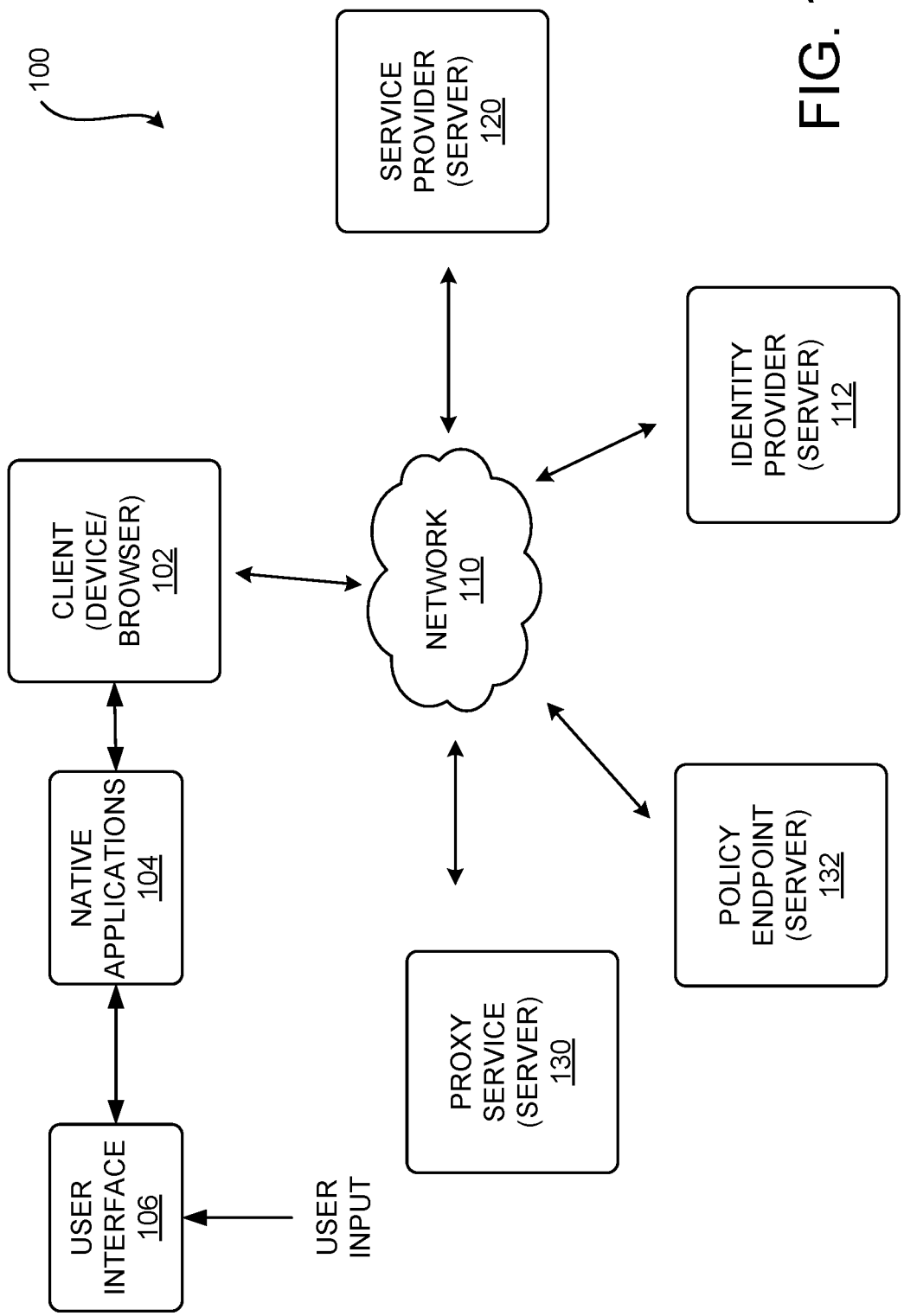

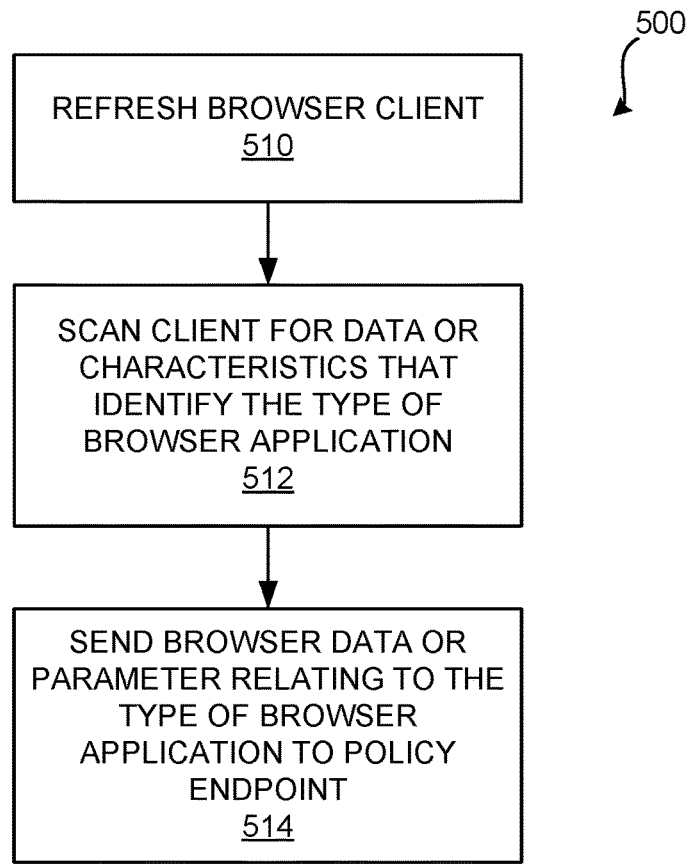

```
if (navigator.platform.substr(0,2) === 'iP'){
        var lte9 = /constructor/i.test(window.HTMLElement);
        var nav = window.navigator, ua = nav.userAgent,
                idb = !!window.indexedDB;
        if (ua.indexOf('Safari') !== -1 &&
                ua.indexOf('Version') !== -1 && !nav.standalone){
                result.iOSBrowserType = "Safari";
        } else if ((!idb && lte9) || !window.statusbar.visible) {
                result.iOSBrowserType = "UIWebView";
        } else if ((window.webkit && window.webkit.messageHandlers)
                || !lte9 || idb){
                result.iOSBrowserType = "WKWebView";
        }
}
```

FIG. 5B

CLIENT-SIDE NATIVE APPLICATION AND BROWSER IDENTIFICATION FOR SESSION CONTROL IN PROXY SOLUTIONS

BACKGROUND

In networked computer systems, proxy services are sometimes used to monitor internet traffic and enforce policy restrictions on user activities on client platforms. A common policy restriction is to limit accessibility to resources to certain allowed platforms, e.g. devices and applications, to prevent access from high risk platforms.

Currently, web applications commonly have multiple user interface (UI) points, such as a web browser UI or applications residing on mobile devices, laptop devices or desktop computers, e.g. native applications. Proxy session control currently typically runs on a web browser UI, but cannot be injected into native applications. Native applications typically contain relevant access endpoints in the code of the application, which cannot be changed. Native applications can also utilize different methods to present themselves during a user login process.

Conventional native application identification approaches have typically relied on the application itself to make a login request to a service provider. For example, in user-agent parsing, many applications declare themselves in a user-agent request header during login, which can be an explicit name of the service or an abbreviation that is sufficiently unique to identify the application. A database of known application identifiers can be maintained with access control rules defined by an administrator, such as policy defined a tenant administrator. When an application login is detected for the user-agent request, the application identifier is checked against the access control rules to determine if the login from the native application on the client is to be blocked or allowed to bypass to the login process.

Another known approach to native application identification is request header parsing. Many mobile applications, such as ANDROID based application, use unique request headers, e.g. "X-Requested-With", to declare themselves during the login process. Often, a particular application declares specific request headers that indicate the identity of the application. For example, a request header for BOX uses "X-Requested-With: com.box.android" declares that the login attempt is from the BOX application on an ANDROID device. Similar to the user-agent parsing technique, a database of known application request headers can be maintained with access control rules that determine whether the corresponding application is to be blocked or allowed to bypass.

As noted, these conventional approaches rely on the applications to identify themselves. However, many applications outsource the authentication process, such as a single-sign-on (SSO) login process, to third party identity and access management providers, e.g. CENTRIFY Corp. of Santa Clara, Calif., using a browser and receive the authentication data from the browser once the login process is completed. These login sessions that involve an application utilizing a browser generally cannot be distinguished from a normal login flow for a browser. In this scenario, a proxy service attempting to perform session control to enforce policy restrictions may be unable to identify a user's platform, e.g. device and application and apply access policies to prevent the use of unsecure native applications.

It is with respect to these and other technical challenges that the disclosure made herein is presented.

SUMMARY

The disclosed technology provides an improved ability of a proxy service to identify user logins coming from native applications on clients through a browser, which enables the proxy service to apply policy rules to block or allow use of these native applications.

In simplified terms, the disclosed technology involves detection in a proxy service of a native application that has performed a login through a browser on a client. A user login request to a service provider is received from the client platform and authenticated with an identity provider through the proxy service, which establishes message flow between the service provider and the client platform through the proxy service. Subsequent to a successful account authorization, a response will be sent to the browser client through the proxy that includes a redirect Universal Resource Locator (URL) for redirection to the native application, e.g. redirect_uri. The proxy service analyzes the responses flowing through the proxy to identify when a response includes a URL that represents a redirect that opens an application.

If the URL does correspond to a redirect that opens an application, then the native application redirect URL in the service request is replaced with a modified redirection URL that incorporates the original native application redirect URL, but redirects the service request to a policy endpoint. The policy endpoint receives the redirected service request and applies access policy to the redirect URL to determine if the service request should be prohibited or allowed. If the redirect URL is prohibited, then a failure response can be returned to the browser client. If the service request is allowed, then the request can be bypassed so that a normal application flow for redirect response is allowed to continue.

In order to realize the technical benefits mentioned briefly above, certain implementations of the disclosed technology for session control of a client-side native application using a browser client for an authentication process involve a proxy service configured to receive an authentication request from a browser client and analyze the authentication request to detect a native application redirect Universal Resource Locator (URL) redirecting to a native application. If the native application redirect URL is detected, the proxy service modifies the native application redirect URL to a modified URL that redirects to a policy endpoint, where the modified URL incorporates the native application redirect URL. The proxy service returns the authentication request to the browser client with the modified URL.

These implementations also involve a policy endpoint configured to receive from the browser client a redirected authentication request with the modified URL and apply policy rules to the native application corresponding to the native application redirect URL incorporated in the modified URL and the browser client to determine whether the native application and the browser client is allowed or prohibited. If the native application and the browser client are allowed, the policy endpoint restores the native application redirect URL in the authentication request and redirects the authentication request to an identity provider for authentication. If the native application and the browser client are prohibited, the policy endpoint sends a failure indication to the browser client.

In some implementations, the proxy service injects browser detection code into the authentication request to be returned to the browser client with the modified URL. The browser detection code is configured to scan the browser client to determine a type of the browser client and send browser data relating to the type of the browser client to the policy endpoint. The policy endpoint receives the browser data relating to the type of the browser client applies the policy rules to the native application redirect URL incorporated in the modified URL and the browser client and the browser data to determine whether the native application and the browser client is allowed or prohibited.

In certain implementations, the browser detection code is configured to scan the browser client to determine a type of the browser client by checking settings of the browser client for a standalone property of a navigation object, a window.statusbar.visible property or a window.webkit property.

In many implementations, the authentication process relates to a Single-Sign-On (SSO) authentication process.

In particular implementations, the policy endpoint redirects the authentication request to an identity provider by sending a Hyper Text Transfer Protocol (HTTP) message with a status code 302 to the browser client to bypass the authentication request.

In some implementations, the failure indication sent to the browser client comprises at least one of an HTTP message with a status code 403 and a Hyper Text Markup Language (HTML) page configured to display a failure message to a user.

In certain implementations, the authentication request can be a login request from the browser client. In other implementations, the authentication request can be an authentication response from the identity provider responsive to the login request from the browser client.

As discussed briefly above, implementations of the technologies disclosed herein enable access control by a proxy service to be applied to client-side native applications that utilize a browser client to perform a login process. This allows access to be limited to native applications and browsers that are permitted by defined policy rules, which allows security policy to be applied even when an application utilizes a separate browser client to perform a login process, such as an SSO login. This leads to improved security for resources to which access is granted in the login process.

ability to apply security policy to native applications and browsers on a client improves the security of resources accessed by the applications, which will result in higher availability, integrity and efficiency of computer resources for users of computer systems. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is a network architecture diagram showing an illustrative example of a networked computing environment involving a browser client on a device, a proxy service, a policy endpoint, a service provider and an identity provider;

FIG. 5A is a flow diagram illustrating an example of a process for browser detection in browser detection code injected into a browser client in accordance with certain aspects of the disclosed technology;

FIG. 5B is a code block illustrating an example of browser detection code for injection into a browser client in accordance with certain aspects of the disclosed technology

DETAILED DESCRIPTION

Figure 2A:
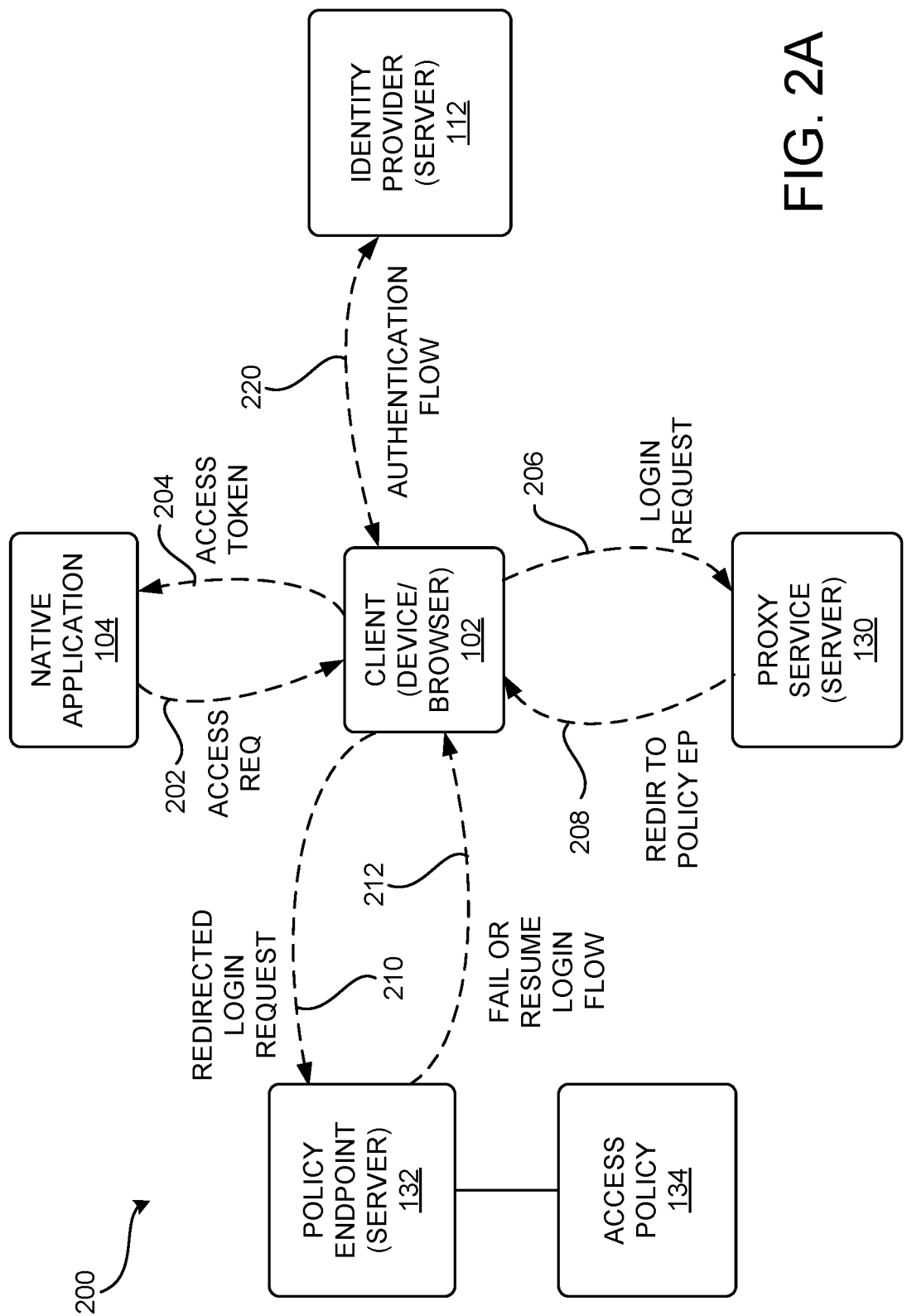
FIG. 2A is a software architecture diagram showing an illustrative example of a conventional exchange of messages in accordance with the disclosed technology between a browser client, a proxy service and a policy endpoint, where a client-side native application on the client utilizes the browser client for an authentication process.

The following detailed description is directed to session control technology involving a proxy service that detects a client-side mobile or native application that utilizes a browser client for a login process. The detection of the mobile or native application enables policy rules to be applied to these applications to control which applications can be utilized on a client.

As discussed above, many conventional native application identification approaches rely on the application to identify itself during a login process. However, some native applications use a browser to export authentication, e.g. a SSO login process, to a third party identity and access provider. In these instances, the native application opens the browser process user interface, which prompts the user to enter authentication credentials for the login process.

When a native application utilizes a browser to perform a login process, it will generally appear to a proxy service to be a login process conducted by a user using the browser. If the native application is not recognized, then policy rules cannot be applied to the native application, thereby degrading security.

As part of the authentication process during a login, the native application sends a Relay State parameter along with a future Universal Resource Locator (URL) to return to after the login process has been completed. By inspecting the RelayState parameter, the origin of the login request can be inferred and a determination can be made as to whether the login request has been made via a mobile or native application or a regular web browser.

For example, when the authentication process is initiated by the browser client, a response will be sent to the browser client through the proxy that includes a redirect Universal Resource Locator (URL) for redirection to the native application, e.g. redirect_uri. Depending upon the application implementation of the login process, the authentication response can be a Hyper Text Transfer Protocol (HTTP) 302 redirect or a form of action that is in a Hyper Text Markup Language (HTML) page. A custom URL schema is typically used in the native application that causes the browser to redirect the user back to the native application with the authentication data on completion of the authentication process.

In the disclosed technology, the login request from the browser client or the authentication response to the login request from the browser client passes through the proxy service. The proxy service analyzes the login request or authentication response to determine whether the it includes a URL that represents a redirect that opens a native application. When the proxy service detects a URL that redirects to a native application, the proxy service will modify the URL to instead redirect the authentication response to a policy endpoint, which will apply policy to the native application indicated in the URL to determine whether the login by the native application is to be blocked or allowed, e.g. bypassed. The modified policy endpoint URL still includes the URL that redirects to the native application, which permits the policy endpoint to identify the native application and restore the native application redirect URL if the native application is allowed.

The policy endpoint service determines whether the request is to be blocked or bypassed. If the request should be blocked, a failure message is provided or the user can be notified, such as by providing an "action blocked" page for display to the user. If the request should be bypassed, then an HTTP 302 response can be sent to the client that redirects the user to the original redirect URL for the native application, which permits the normal execution flow for the login request to continue.

In addition, in some examples, browser detection code is injected to the browser performing the SSO login process to detect a type of the browser. A response to the browser causes the browser to perform an auto submit of the request form. The browser detection code injected into the browser scans the browser client to detect data or characteristics that identify the type of the browser application. A parameter data relating to the type of the browser application is sent to the policy endpoint in the auto submitted form for use in applying policy to the native application and browser combination. The browser detection code allows characteristics to be detected that differentiate browsers, such as different iOS browsers, and in-application web views.

In general terms, implementations of the disclosed technology can provide an approach that enables access policy to be applied to native applications that use a web browser to perform a login process, e.g. SSO login. When a user performs a login process on a native application, the native application opens a web-based process. The web-based login process is configured such that, after the login has successfully completed, the browser will redirect the user back to the native application using a custom URL scheme. This depends on the implementation of the login process in the native application. For example, the redirect could be either an HTTP 302 redirect response or it can be a form action that is in an HTML page.

During the wrapping of the responses in a session control part of a proxy service, the request containing a URL redirect back to the native application is modified from its regular form in the native application login process to a request to a policy endpoint. This will cause the user to go through the policy endpoint before returning to the native application. The policy endpoint can then apply access policy to the login request and determine whether to block the login request or bypass it to the normal login flow.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable customer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several figures, aspects of session control in a proxy service for client-side applications that provides improved security will be described.

FIG. 1 is a network architecture diagram showing an illustrative example of a network computing environment 100 involving a client device 102 in communication with service provider 120 and proxy service 130 through network 110. Client 102 can be a device, such as a personal computer or a smart phone, with a browser application. A user can utilize a client-side native application 104 with user interface 106 to perform a login process, such as a SSO login, through the browser client 102 to authenticate the user and obtain access to resources through network 110, such as the resources of service provider 120.

Service provider 120 supports services and content that can be accessed by client 102 through proxy service 130 via network 110. For example, when client 102 attempts to access services and content on service provider 120, the access is routed through proxy service 130, which monitors the message traffic between client 102 and service provider 120.

A user utilizing client 102 to access services typically authenticates the user and obtains access permission utilizing identity provider 112. In one example, native application 104 utilizes client browser 102 to perform a login or authentication process, e.g. SSO login, with identity provider 112. Communication between client browser 102 and identity provider 112 flows through proxy service 130.

In the example of FIG. 1, the disclosed technology includes policy endpoint 132, which applies access policy to user access requests. In the disclosed technology, a login request from client browser 102 that includes a URL redirecting an authentication response to native application 104 is detected by proxy service 130. As discussed below, proxy service 130 modifies the URL in the login request to redirect the request to policy endpoint 132, which applies security policy to the request to determine whether the native application and browser combination are permitted under the defined policy.

FIG. 2A is a software architecture diagram that illustrates a simplified example of an exchange of messages 200 between client browser 102 and identity provider 112 through proxy service 130 in accordance with one aspect of the disclosed technology. In this example scenario, at 202, client 102 sends a login request with an application Universal Resource Locator (URL) redirecting to native application 104 to identity provider 112. Proxy service 130 receives the login request and modifies the application URL to redirect the login request to policy endpoint 132, at 210.

Policy endpoint 132 applies the policies defined in access policy store 134 to the browser client 102 and native application 104 and responds, at 212. A failure response is returned at 212 if the browser client and native application combination is not permitted under the defined access policy. If the browser client and native application combination is permitted under access policy, policy endpoint 132 restores the native application URL in the response and sends a response to browser client 102 that permits a normal authentication flow with identity provider 112 to resume, which results in an authentication response containing an access token being redirected to native application 104 by browser client 102, at 204.

In an alternative example scenario, the login request from native application 104 through browser client 102 is directed to identity provider 112, which directs an authentication request for user credentials to browser client 102 through proxy service 130. Proxy service 130 receives the authentication response and, if it detects the application URL in the authentication response, modifies the application URL to redirect to policy endpoint 132 to apply security policy to the browser client and native application combination.

If the browser client and native application combination is permitted under access policy, then policy endpoint 132 restores the native application URL in the authentication request for user credentials and sends an authentication request to browser client 102 to allow a normal authentication flow with identity provider 112 to resume. For example, the redirect from policy endpoint 132 could be an HTTP 302 redirect response or it can be a form action that is in an HTML page.

As noted above, one example of a native application URL involves the FACEBOOK application provided by FACEBOOK, INC. of Palo Alto, Calif. The FACEBOOK application may use:

```
fb-work-sso://sso/?request_id=123&uid=456&
nonce_type=login&nonce=789
``` as a redirect URL that redirects the user to the FACEBOOK WORKPLACE communications application. The proxy service, in this example, detects the redirect URL as redirecting to an application, e.g. by recognizing the fb-work-sso string as an action redirecting to the WORKPLACE application, and replaces the redirect URL with a policy endpoint URL that redirects to a policy endpoint server, such as:

```
/McasPoliciesEndPoint.js?policy=NativeApps&
location=fb-work-sso%3A%2F%2Fsso%2F%3Frequest_id%3
D123%26uid%3D456%26nonce_type%3Dlogin%26nonce%3D789
```

Note that the policy endpoint URL contains the original native application location that the user was being directed to in the redirect URL, e.g. fb-work-sso://sso, which permits the native application URL to be identified by the policy endpoint 132 and for the native application URL to be restored if access is authorized.

The policy endpoint service determines whether the request is to be blocked or bypassed. If the request should be blocked, the user can be notified, such as by providing an "action blocked" page for display to the user. If the request should be bypassed, then an HTTP 302 response is sent to the browser client that redirects the user to the original redirect URL for the native application, e.g. fb-work-sso://sso, which permits the normal execution flow for the login request to continue. If policy endpoint 132 determines that the request should be blocked, then an "action blocked" page can be provided to the user.

This aspect of the disclosed technology provides for session control to be extended to a native application utilizing a browser client. Policy is applied at an early stage in the login process to a user login request received in a proxy service. If the policy to be applied determines that the login request with the native application and browser client is permitted, then the login request can be bypassed to resume the normal authentication process flow. This approach can be implemented within a proxy service and does not require modification of the login processes in the native application or browser client.

This aspect of the disclosed technology provides for session control to be applied to native applications that utilize web-browsers for a SSO login process. Generally, this aspect assumes that session control can be maintained intact by the proxy service before handing control back to the native application.

In certain scenarios, maintaining session control may not be possible resulting in disruption of the normal login flow in specific native applications. In these scenarios, browser type detection may need to be performed early in the login flow, e.g. before the proxy service starts suffixing the session.

To address this issue, browser detection code can be injected into the browser client by the proxy service early in the login process. The browser detection code is configured to scan the browser client for characteristics that identify the specific type or version of the browser client utilized in the login process. The difference between the types or version of a browser can be based on javascript elements and objects that are defined in one of them and not in the others. For example, there are specific differences in browser features between the APPLE iOS WKWebView, iOS UIWebview, and regular iOS Safari browsers provided by APPLE INC. of Cupertino, Calif.

In another aspect of the disclosed technology, when a user initiates a login using a browser that may have multiple variants, e.g. a suspected iOS Safari browser, browser detection code, e.g. a Javascript payload, is injected to collect the relevant data about the browser and send the analysis back to the proxy service for use in applying policy to the login request. The proxy service can then respond in accordance with the defined policies.

Figure 2B:
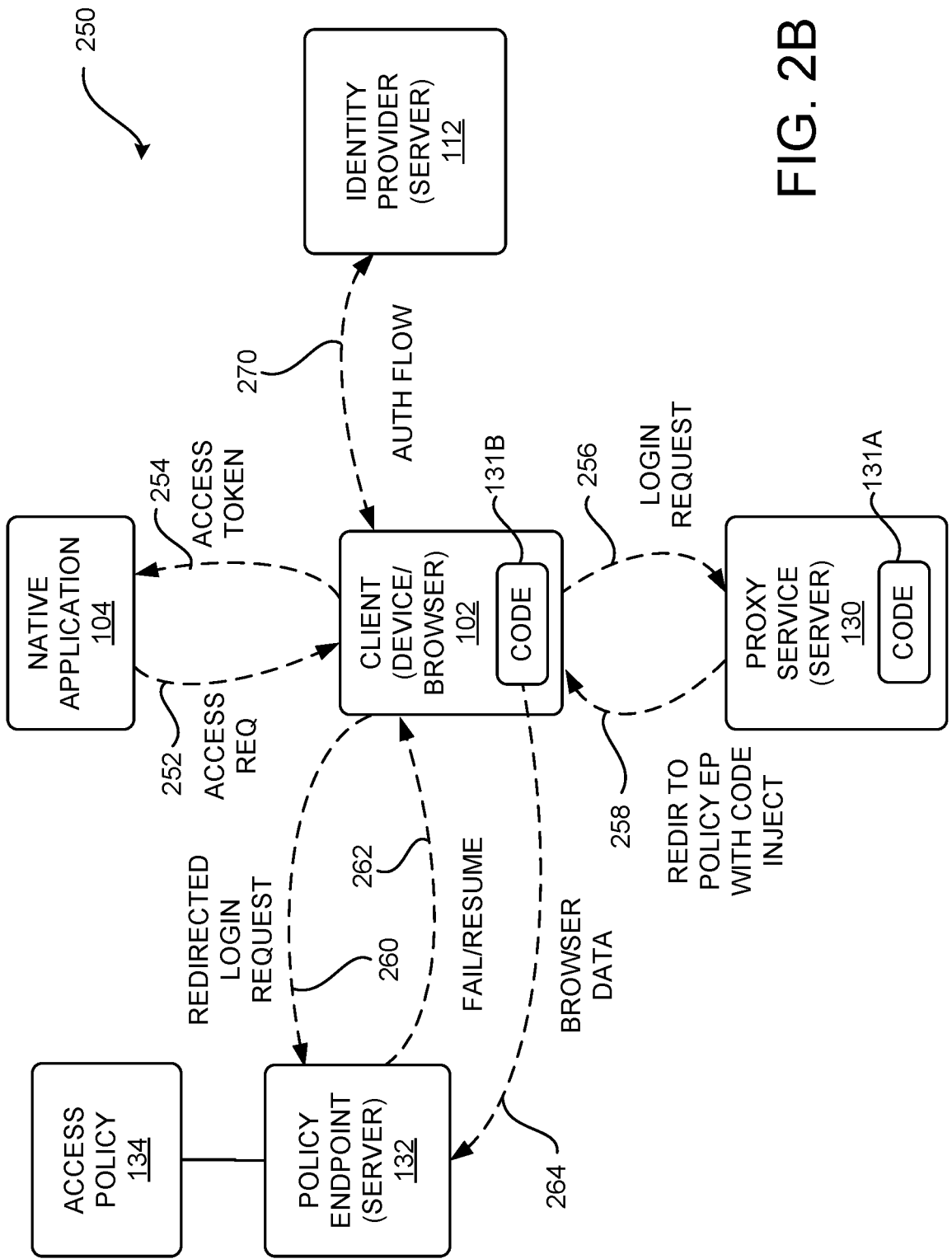
FIG. 2B is a software architecture diagram showing an illustrative example of an exchange of messages between a browser client, a proxy service and a policy endpoint in accordance with certain aspects of the disclosed technology involving injection of browser detection code to the browser client.

FIG. 2B is a software architecture diagram illustrating another example of an exchange of messages 250 between client browser 102 and identity provider 112 through proxy service 130, which is configured to operate in accordance with aspects of the disclosed technology that includes injection of browser detection code.

Similar to the scenario 200 of FIG. 2A, in this example, at 252, client 102 sends a login request with an application Universal Resource Locator (URL) redirecting to native application 104 to identity provider 112. Proxy service 130 receives the login request, at 256. In response, proxy service 130 scans the login request to determine whether additional browser data is required, e.g. browser client 102 is a "suspect" browser, and, if so, injects browser detection code 131A and modifies the application URL to redirect the login request to policy endpoint 132. At 258, the login request with the modified URL and code 131A is returned to browser client 102.

Browser client 102 receives the redirected login request and injects browser detection code 131B. At 260, the login request is redirected to policy endpoint 132 using the modified URL provided by proxy server 130. The injected browser detection code 131B is executed by browser client 102, e.g. in an automatic refresh action, to scan the browser client 102 to detect characteristics indicating a type or variant of the browser. At 264, the browser data is provided to policy endpoint 132.

Policy endpoint 132 applies the policies defined in access policy store 134 to the browser client 102 and native application 104 information from the redirected login request and the browser data and responds, at 262. If the browser client, native application and browser variant combination is not permitted under the defined access policy, a failure response is returned at 262, e.g. an HTML page indicating failure to the user. If the browser client, native application and browser variant combination is permitted under access policy, policy endpoint 132 restores the native application URL in the response and sends a response to browser client 102 that permits a normal authentication flow 270 with identity provider 112 to resume, which results in an authentication response containing an access token being redirected to native application 104 by browser client 102, at 254.

This aspect of the disclosed technology provides an approach whereby a proxy service can extend session control to a native application utilizing a web-browser client for authentication even when variants of the browser are utilized. The disclosed technology can be implemented in the proxy service without generally requiring modifications to the native application or browser client. As a result, for example, the disclosed technology can be implemented to permit a tenant administrator to extend session control to a native application utilizing a browser client for SSO login.

Figure 3:
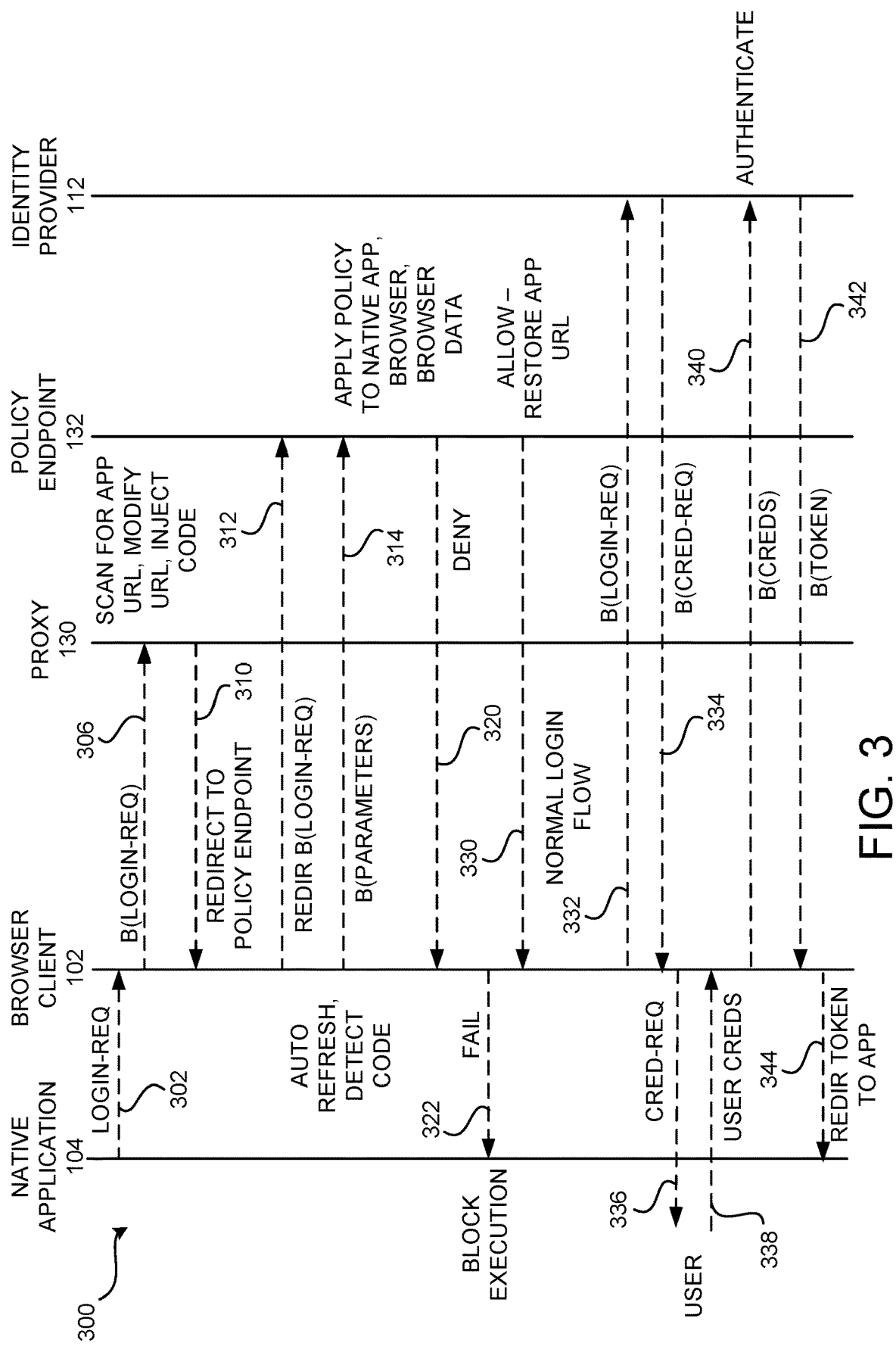
FIG. 3 is a messaging diagram showing an illustration of message transfer between a browser client, a proxy service, a policy endpoint and an identity provider in accordance with the disclosed technology.

FIG. 3 is a messaging diagram showing an illustration of message transfer scenario 300 showing a sequence of messages between native application 104, browser client 102 and identity provider 112 through proxy service 130 for extending session control to a login process for a native client utilizing a browser client for a login process in accordance with the disclosed technology as discussed above with respect to FIGS. 2A and 2B.

At 302, native application 104 uses browser client 102 to initiate a login flow with identity provider 112 through proxy service 130. At 306, browser client 102 sends the login request to proxy service 130. Proxy service 130 scans the login request to detect a native application redirect URL that indicates that the native application 104 is utilizing browser client 102. If a native application redirect URL is detected, proxy service 130 modifies the URL to redirect the login request to policy endpoint 132. As discussed with respect to FIG. 2B above, proxy service 130 may also inject browser detection code to obtain additional browser type and variant information regarding browser client 102. At 310, the login request with the modified redirect URL is returned to browser client 102.

At 312, browser client 102 directs the login request with the modified URL to policy endpoint 132. If browser detection code was injected into browser client 102, the browser client performs an auto refresh to execute the browser detection code to scan for characteristics of browser client, which are provided to policy endpoint 132 at 314.

Policy endpoint 132 applies defined policy to the native application and browser client combination, as well as the browser parameters provided at 314, if needed, to determine whether the login request should be denied or allowed. If the login request is denied, then, at 320, a denial or failure message is sent to browser client 102, which provides a failure indication to the user, at 322, to block execution of the login session.

If policy endpoint 132 determines that the login request is allowed, then it restores the native application redirect URL in a bypass response, at 330, that causes normal login flow to continue. In the resumed normal login flow, in this example, at 332, browser client 102 sends the login request to identity provider 112, which responds, at 334, with a request for user credentials.

At 336, browser client 102 prompts a user for user credentials, which are provided by the user, at 338. Browser client 102 presents the user credentials to identity provider 112, at 340. Identity provider 112 authenticates the user credentials and returns an access token, at 342, to browser client 102. At 344, browser client 102 redirects the authentication response with the access token to native application 104 utilizing the native application redirect URL. Note that the messages between browser client 102 and identity provider 112 described in this example of a normal login flow are routed through proxy service 130.

It will be appreciated that the architecture and messaging shown in the examples associated with FIGS. 2A, 2B and 3 are illustrative and do not limit the scope of the disclosed technology. One of skill in the art will readily recognize that other architectures and message protocols may be utilized in keeping with the disclosed technology.

Further note that alternative implementations are possible without departing from the scope of the disclosed technology. In one example, proxy service 130 scans a login request received from browser client 102 to detect a native application redirect URL. In another example, proxy service 130 scans an authentication response from identity provider 112 responding to the login request from browser client 102 that is routed through the proxy service 130. Also, in some examples, browser detection code is injected into browser client 102. Other examples do not utilize browser detection code. One of ordinary skill in the art will appreciate that the disclosed technology generally provides an effective approach to session control by a proxy service over a login process in native applications that utilize a browser client.

Figure 4A:
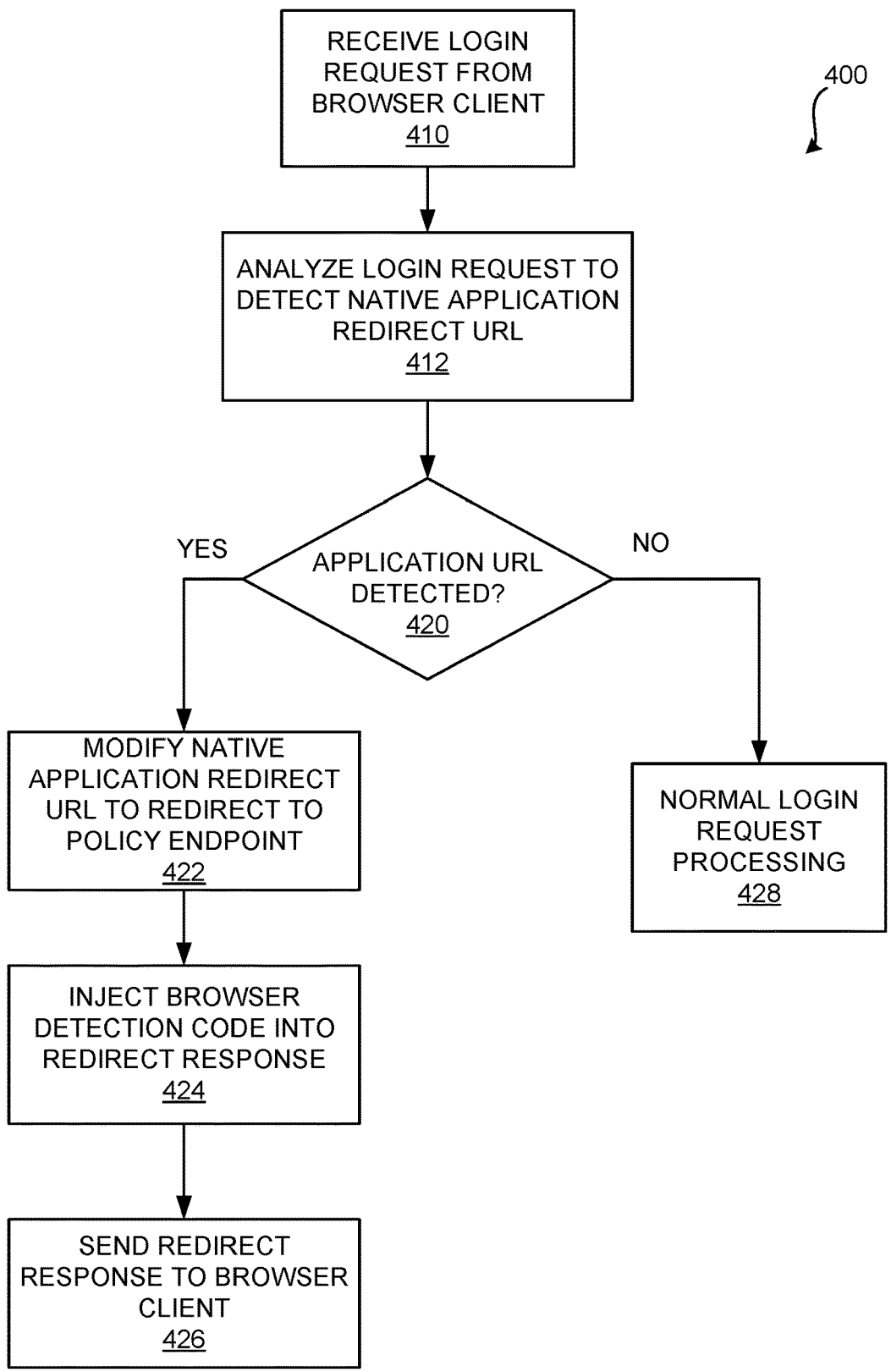
FIG. 4A is a flow diagram showing an illustrative example of a process in a proxy service in accordance with the disclosed technology, where a native application using a browser client is detected and redirected to a policy endpoint in accordance with the disclosed technology.
Figure 4B:
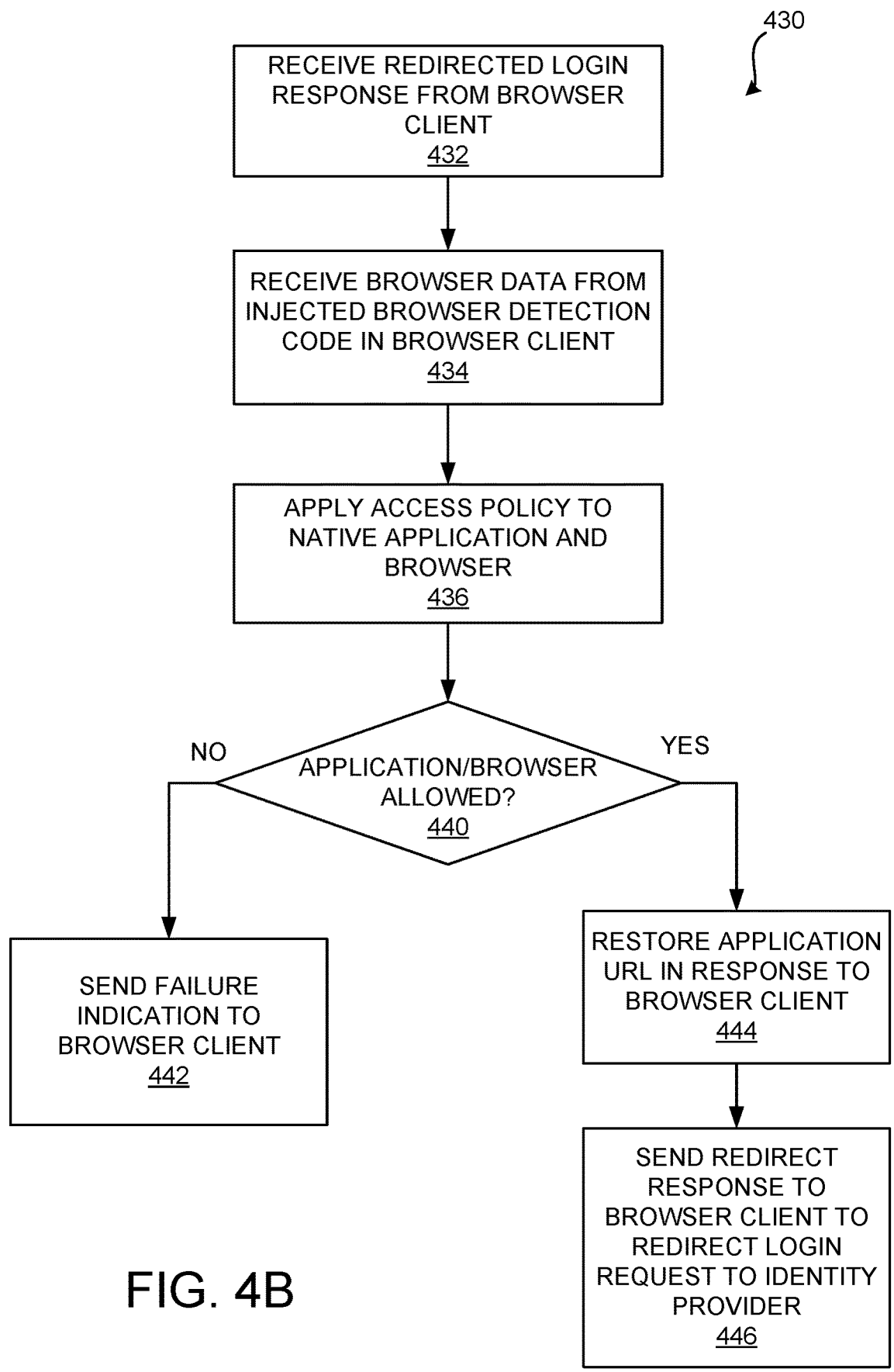
FIG. 4B is a flow diagram showing an illustrative example of a process in a policy endpoint for applying policy for session control of native applications using a browser client in accordance with the disclosed technology.

FIGS. 4A-B are flow diagrams showing an illustrative example of processes executing in proxy service 130 and policy endpoint 132 in accordance with certain aspects of the disclosed technology. Note that the disclosed technology generally does not require changes to code in the native application 104, browser client 102 and identity provider 112. The processes in proxy service 130 and policy endpoint 132 in accordance with the disclosed technology are generally sufficient to implement the disclosed approach to maintaining session control by a proxy service over native applications utilizing a browser client for a login process, e.g. SSO login. The process 500 and code 520 in FIGS. 5A-B illustrate an example browser detection code injected by proxy service 130 and executed in browser client 102 in the course of normal operation of the browser client.

FIG. 4A is a control flow diagram showing an illustrative example of a process 400 in a proxy service in accordance with the disclosed technology. In the example of FIG. 4A, at 410, a proxy service receives a login request from a browser client and, at 412, scans the login request to detect whether the request includes a redirect URL to a native application.

If the proxy service detects a native application redirect URL, then control branches at 420 to 422. At 422, the proxy service modifies the URL in the login request to redirect the request to a policy endpoint. The modified URL retains the native application redirect URL, which permits the policy endpoint to identify the native application and restore the native application redirect URL.

Some optional implementations of process 400 can include injection of browser detection code into the redirect response, at 424. At 426, the redirect response is sent to the browser client for redirection to the policy endpoint. If no native application redirect URL is detected in the login request, control branches at 420 to 428 for continuation of normal login process flow with an identity provider.

FIG. 4B is a control flow diagram showing an illustrative example of a process 430 in a policy endpoint in accordance with the disclosed technology. In the example of FIG. 4B, at 432, the login request redirected by the proxy service process 400 is received from the browser client. In implementations involving browser detection code, at 434, browser data from the browser detection code injected in the browser client is received.

At 436, the policy endpoint applies the access policy to the native application, the browser client and, if utilized, the browser data received from the browser detection code. For example, the access policy can be a database of known application and browser identifiers along with access control rules defined by a tenant administrator. The database can also include browser type or variant parameters associated with browsers and relating to the browser data provided by the browser detection code.

If the policy endpoint determines that the native application and browser client combination is not allowed based on the defined policy, then, at 440, control branches to 442, where a failure indication is sent to the browser client. For example, a message with the status code "403—Unauthorized" or an HTML document or page with text informing the user that the action is not allowed.

If the policy endpoint determines that the native application and browser client combination is allowed based on the defined policy, then, at 440, control branches to 444, where the policy endpoint restores the native application redirect URL, e.g. fb-work-sso://sso. At 446, the policy endpoint sends a redirect response to the browser client to redirect or bypass the login request to an identity provider for authentication of the user. At this point, normal login process flow resumes between the browser client and the identity provider.

FIG. 5A is a control flow diagram illustrating an example of a browser detection process 500 that can occur in the browser client when the browser detection code is injected at 424 in FIG. 4A. At 510, an auto refresh of the browser client causes the injected browser detection code to execute. For example, the response from the proxy server with the browser detection code for browser client causes the browser client to generate an auto submitted form with the original login request along with browser data or parameters from the browser detection code.

At 512, the browser detection code scans the client for data or characteristics that identity the type or variant of the browser application of the browser client. For example, a standard iOS Safari browser will have a navigator object with a "standalone" property set to false, whereas iOS UIWebview and WKWebview have this property set to true. In another example, a window.IndexedDB property is a way to persistently store data inside a user's browser, which is enabled in WKWebview, but not in UIWebview. These examples illustrate how a map of which properties are enabled or set and which are not can be created to determine a specific browser type or variant.

At 514, the browser data or parameter from the browser detection code that relates to the type or variant of browser application is sent to the policy endpoint. For example, a parameter from the browser detection code is populated in an auto submitted form in the browser application, which is sent to the policy endpoint.

FIG. 5B is a code block illustrating an example of the browser detection code utilizing Javascript code. This example relates to the example above regarding the iOS Safari browser. The code first checks whether nay.standalone is set to false and, if it is, returns result.iOSBrowserType="Safari" as a parameter. If the browser type is not Safari, the code next checks for characteristics specific to UIWebView, e.g. ((!idb && lte9)|| !window.statusbar.visible), and, if the characteristics are found, returns result.iOSBrowserType="UIWebView" as the parameter. Finally, the code checks for characteristics specific to WKWebView, e.g. (window.webkit && window.webkit.messageHandlers)||!lte9||idb), and, if they are found, returns result.iOSBrowserType="WKWebView" as the parameter.

One of skill in the art will readily appreciate that a variety of approaches may be utilized for extending session control in a proxy service to client-side native applications and browser clients without departing from the scope of the disclosed technology. The approach of the disclosed technology enables policy rules to be applied in a client even when a client-side native application utilizes a browser client in a login process, e.g. SSO login, which improves the control and security of the login process.

It is to be appreciated that while the embodiments disclosed herein have been presented primarily in the context of performing session control in a proxy service for client-side applications in a client. The technologies disclosed herein can be similarly applied to other contexts where similar functionality is utilized to perform session control for client-side native applications and browser clients.

Figure 6:
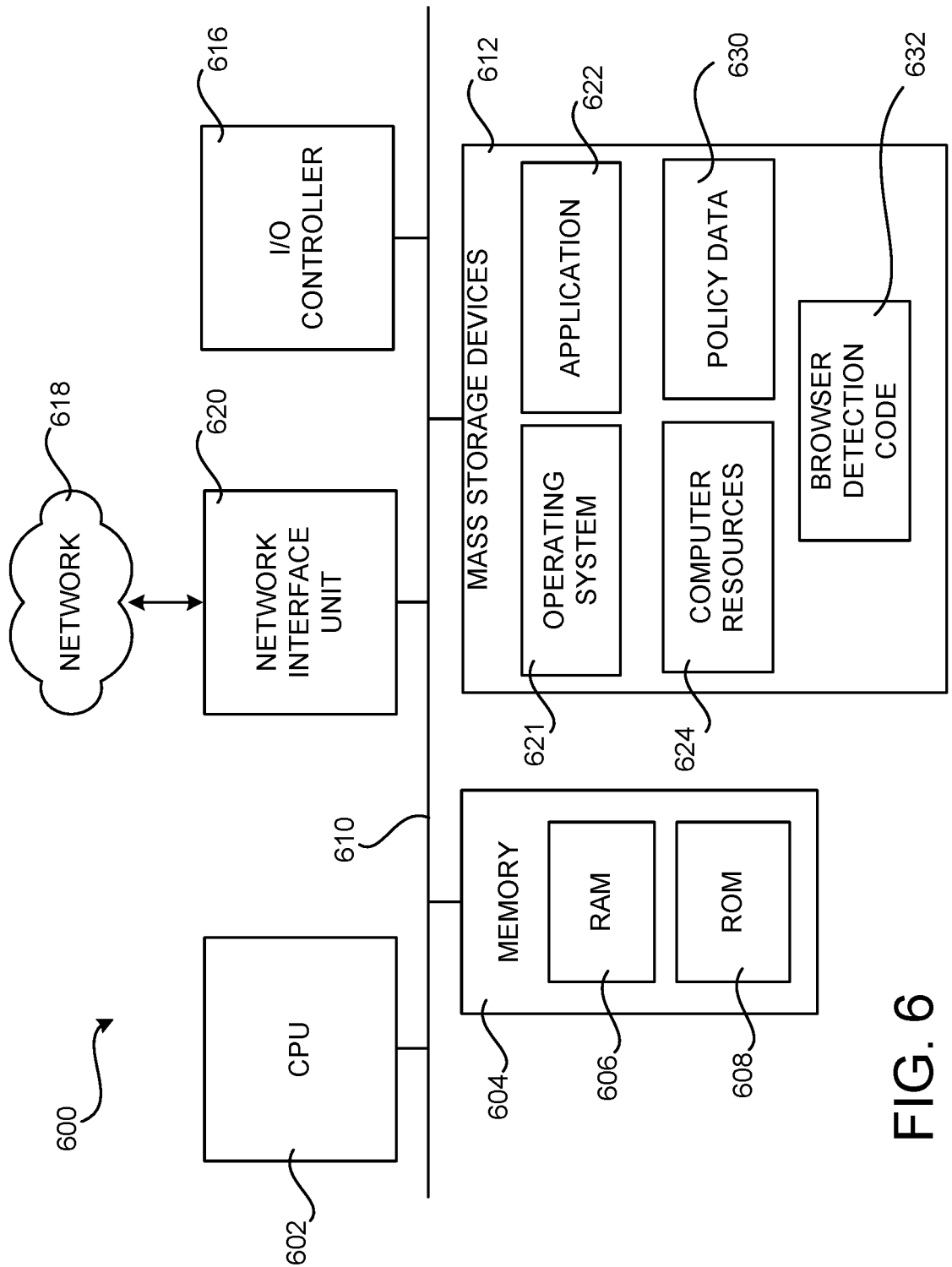
FIG. 6 is a computer architecture diagram showing an illustrative computer hardware and software architecture for a computing device, such as the computing devices shown in FIGS. 1, 2A and 2B, that can implement aspects of the technologies presented herein.

FIG. 6 is a computer architecture diagram that shows an architecture for a computer 600 capable of executing the software components described herein. The architecture illustrated in FIG. 6 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 600 shown in FIG. 6 can be utilized to implement a computing device capable of executing any of the software components presented herein. For example, and without limitation, the computing architecture described with reference to FIG. 6 can be utilized to implement the client 102, identity provider 112, service provider 120, proxy service 130 and policy endpoint 132 illustrated in the system 100 of FIG. 1, which is capable of executing the various software components described above, such as the operations of the processes illustrated in FIGS. 4A-B and 5A.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, is stored in the ROM 608. The computer 600 further includes one or more mass storage devices 612 for storing an operating system 621, application programs 622, and other types of programs and data including, but not limited to, the computer resources 624, policy data 630 and browser detection code 632. The computer resources 624, policy data 630 and browser detection code can be stored in a different storage device from one another.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer executable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 618. The computer 600 can connect to the network 618 through a network interface unit 620 connected to the bus 610. It should be appreciated that the network interface unit 620 can also be utilized to connect to other types of networks and remote computer systems. The computer 600 can also include an input/output controller 616 for receiving and processing input from a number of other devices, including a keyboard, mouse, touch input, or electronic stylus (not shown in FIG. 6). Similarly, the input/output controller 616 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones and tablets, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
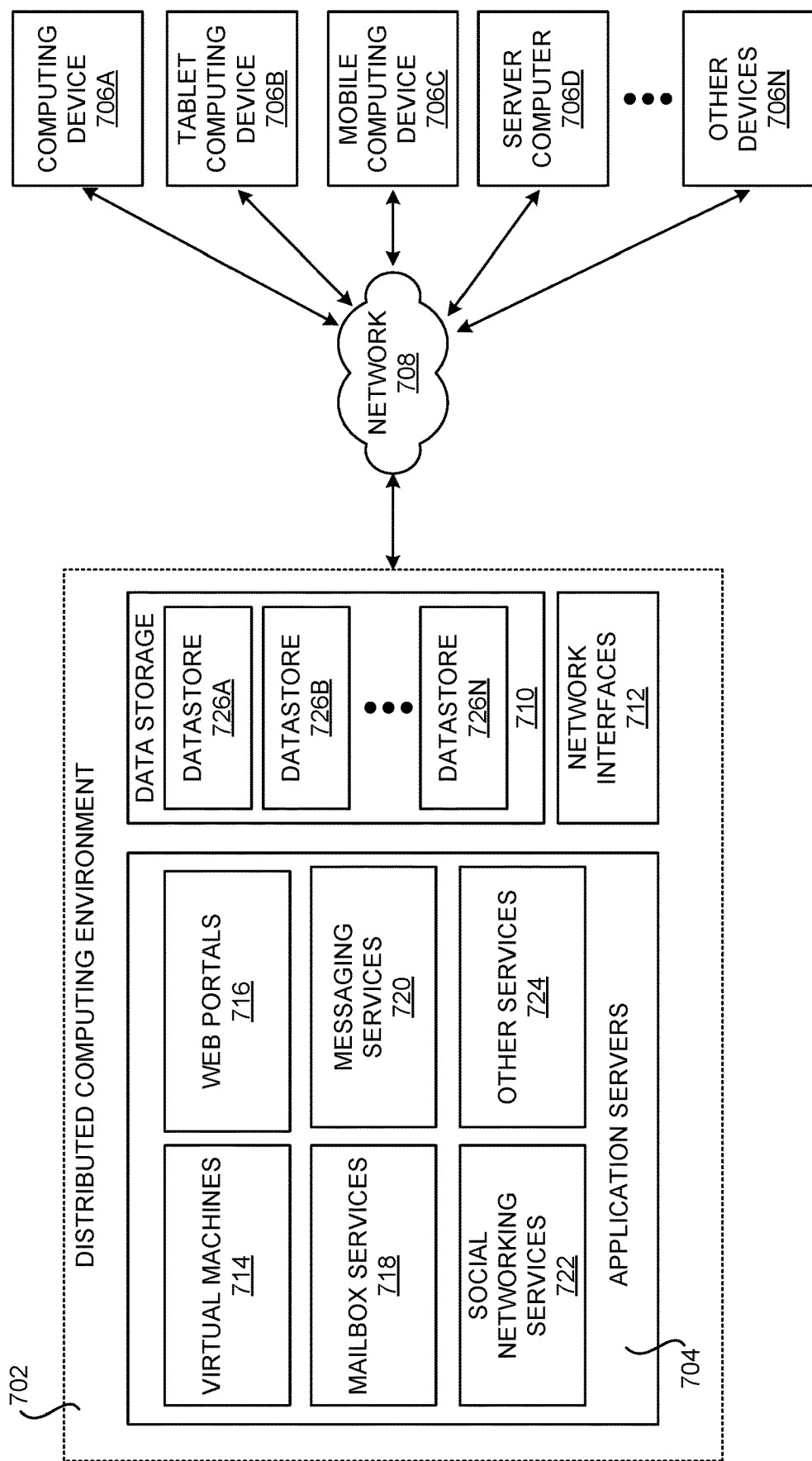
FIG. 7 is a network diagram illustrating a distributed computing environment capable of implementing aspects of the technologies presented herein.

FIG. 7 shows aspects of an illustrative distributed computing environment 702 that can provide cloud sourced resources, such as the resources for identity provider 112, service provider 120, proxy service 130 and policy endpoint 132 of FIGS. 1 and 3, in which the software components described herein can be executed. Thus, the distributed computing environment 702 illustrated in FIG. 7 can be used to execute program code capable of providing the functionality described above with respect to FIGS. 1-5B and/or any of the other software components described herein.

According to various implementations, the distributed computing environment 702 operates on, in communication with, or as part of a network 708. One or more client devices 706A-706N (hereinafter referred to collectively and/or generically as "devices 706") can communicate with the distributed computing environment 702 via the network 708 and/or other connections (not illustrated in FIG. 7).

In the illustrated configuration, the devices 706 include: a computing device 706A such as a laptop computer, a desktop computer, or other computing device; a "slate" or tablet computing device ("tablet computing device") 706B; a mobile computing device 706C such as a mobile telephone, a smartphone, or other mobile computing device; a server computer 706D; and/or other devices 706N. It should be understood that any number of devices 706 can communicate with the distributed computing environment 702. Two example computing architectures for the devices 706 are illustrated and described herein with reference to FIGS. 6 and 8. It should be understood that the illustrated client devices 706 and computing architectures illustrated and described herein are illustrative and should not be construed as being limited in any way.

In the illustrated configuration, the distributed computing environment 702 includes application servers 704, data storage 710, and one or more network interfaces 712. According to various implementations, the functionality of the application servers 704 can be provided by one or more server computers that are executing as part of, or in communication with, the network 708. The application servers 704 can host various services such as virtual machines, portals, and/or other resources. In the illustrated configuration, the application servers 704 host one or more virtual machines 714 for hosting applications, such as program components for implementing the functionality described above with regard to FIGS. 1-5. It should be understood that this configuration is illustrative and should not be construed as being limiting in any way. The application servers 704 might also host or provide access to one or more web portals, link pages, websites, and/or other information ("web portals") 716.

According to various implementations, the application servers 704 also include one or more mailbox services 718 and one or more messaging services 720. The mailbox services 718 can include electronic mail ("email") services. The mailbox services 718 can also include various personal information management ("PIM") services including, but not limited to, calendar services, contact management services, collaboration services, and/or other services. The messaging services 720 can include, but are not limited to, instant messaging ("IM") services, chat services, forum services, and/or other communication services.

The application servers 704 can also include one or more social networking services 722. The social networking services 722 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 722 are provided by or include the FACEBOOK social networking service, the LINKEDIN professional networking service, the FOURSQUARE geographic networking service, and the like. In other configurations, the social networking services 722 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 722 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 722 are not mentioned herein for the sake of brevity. As such, the configurations described above are illustrative, and should not be construed as being limited in any way.

As also shown in FIG. 7, the application servers 704 can also host other services, applications, portals, and/or other resources ("other services") 724. These services can include, but are not limited to, streaming video services like the NETFLIX streaming video service and productivity services such as the GMAIL email service from GOOGLE INC. It thus can be appreciated that activities performed by users of the distributed computing environment 702 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 702 can include data storage 710. According to various implementations, the functionality of the data storage 710 is provided by one or more databases operating on, or in communication with, the network 708. The functionality of the data storage 710 can also be provided by one or more server computers configured to host data for the distributed computing environment 702. The data storage 710 can include, host, or provide one or more real or virtual datastores 726A-726N (hereinafter referred to collectively and/or generically as "datastores 726"). The datastores 726 are configured to host data used or created by the application servers 704 and/or other data.

The distributed computing environment 702 can communicate with, or be accessed by, the network interfaces 712. The network interfaces 712 can include various types of network hardware and software for supporting communications between two or more computing devices including, but not limited to, the devices 706 and the application servers 704. It should be appreciated that the network interfaces 712 can also be utilized to connect to other types of networks and/or computer systems.

It should be understood that the distributed computing environment 702 described herein can implement any aspects of the software elements described herein with any number of virtual computing resources and/or other distributed computing functionality that can be configured to execute any aspects of the software components disclosed herein. It should also be understood that the devices 706 can also include real or virtual machines including, but not limited to, server computers, web servers, personal computers, gaming consoles or other types of gaming devices, mobile computing devices, smartphones, and/or other devices. As such, various implementations of the technologies disclosed herein enable any device configured to access the distributed computing environment 702 to utilize the functionality described herein.

Figure 8:
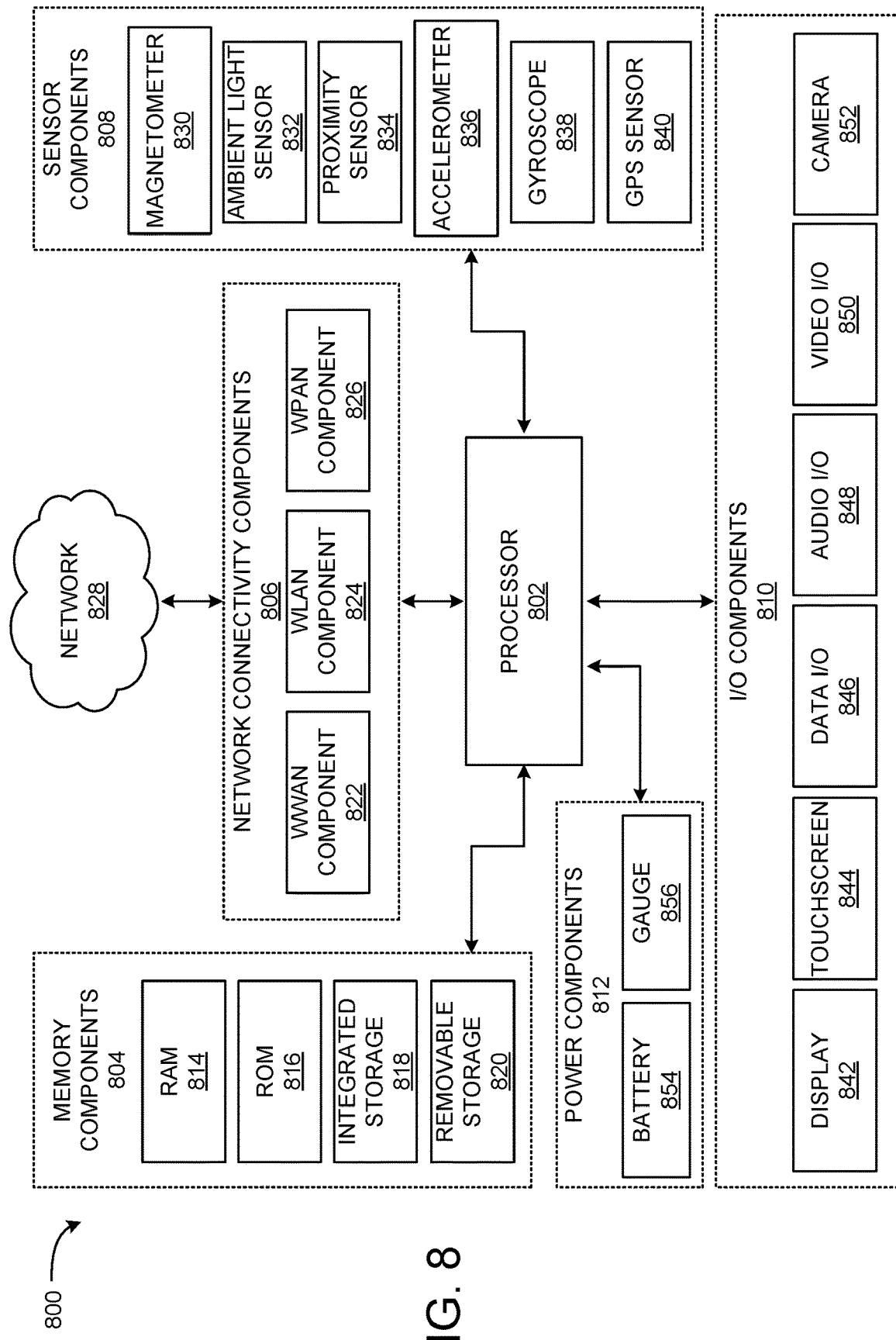
FIG. 8 is a computer architecture diagram illustrating a computing device architecture for a computing device, such as the computing devices shown in FIGS. 1, 2A and 2B, that is capable of implementing aspects of the technologies presented herein.

Turning now to FIG. 8, an illustrative computing device architecture 800 will be described for a computing device, such as the client 102, identity provider 112, service provider 120, proxy service 130 and policy endpoint 132 illustrated in the system 100 of FIG. 1, that is capable of executing the various software components described herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 800 is also applicable to any of the devices 706 shown in FIG. 7. Furthermore, aspects of the computing device architecture 800 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, smartphone, or tablet computer devices that utilize a touchscreen or some other touch-enabled device, such as a touch-enabled track pad or touch-enabled mouse. The computing device architecture 800 can also be utilized to implement the client 102, identity provider 112, service provider 120, proxy service 130 and policy endpoint 132 illustrated in the system 100 of FIG. 1 and/or other types of computing devices for implementing or consuming the functionality described herein.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can be connected electrically in order to interact and carry out device functions. In some configurations, the components are arranged so as to communicate via one or more busses (not shown).

The processor 802 includes one or more CPU cores configured to process data, execute computer executable instructions of one or more application programs and to communicate with other components of the computing device architecture 800 in order to perform various functionality described herein. The processor 802 can be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 802 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 802 is, or is included in, a system-on-chip ("SoC") along with one or more of the other components described herein below. For example, the SoC can include the processor 802, a GPU, one or more of the network connectivity components 806, and one or more of the sensor components 808. In some configurations, the processor 802 is fabricated, in part, utilizing a package-on-package ("PoP") integrated circuit packaging technique. Moreover, the processor 802 can be a single core or multi-core processor.

The processor 802 can be created in accordance with an ARM architecture, available for license from ARM HOLDINGS of Cambridge, United Kingdom. Alternatively, the processor 802 can be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a RAM 814, a ROM 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 can be soldered or otherwise connected to a logic board upon which the processor 802 and other components described herein might also be connected. As such, the integrated storage 818 is integrated in the computing device. The integrated storage 818 can be configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which can be a WWAN, a WLAN, or a WPAN. Although a single network 828 is illustrated, the network connectivity components 806 can facilitate simultaneous communication with multiple networks. For example, the network connectivity components 806 can facilitate simultaneous communications with multiple networks via one or more of a WWAN, a WLAN, or a WPAN.

The network 828 can be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 828 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 can be configured to provide voice and/or data communications with any combination of the above technologies. The network 828 can be configured or adapted to provide voice and/or data communications in accordance with future generation technologies.

In some configurations, the WWAN component 822 is configured to provide dual-multi-mode connectivity to the network 828. For example, the WWAN component 822 can be configured to provide connectivity to the network 828, wherein the network 828 provides service via GSM and UMTS technologies, or via some other combination of technologies. Alternatively, multiple WWAN components 822 can be utilized to perform such functionality, and/or provide additional functionality to support other non-compatible technologies (i.e., incapable of being supported by a single WWAN component). The WWAN component 822 can facilitate similar connectivity to multiple networks (e.g., a UMTS network and an LTE network).

The network 828 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 828 via the WI-FI access points. Such connections can be secured via various encryption technologies including, but not limited, WI-FI Protected Access ("WPA"), WPA2, Wired Equivalent Privacy ("WEP"), and the like.

The network 828 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, might also be incorporated in the computing device architecture 800.

The magnetometer 830 is configured to measure the strength and direction of a magnetic field. In some configurations, the magnetometer 830 provides measurements to a compass application program stored within one of the memory components 804 in order to provide a user with accurate directions in a frame of reference including the cardinal directions, north, south, east, and west. Similar measurements can be provided to a navigation application program that includes a compass component. Other uses of measurements obtained by the magnetometer 830 are contemplated.

The ambient light sensor 832 is configured to measure ambient light. In some configurations, the ambient light sensor 832 provides measurements to an application program stored within one the memory components 804 in order to automatically adjust the brightness of a display (described below) to compensate for low light and bright light environments. Other uses of measurements obtained by the ambient light sensor 832 are contemplated.

The proximity sensor 834 is configured to detect the presence of an object or thing in proximity to the computing device without direct contact. In some configurations, the proximity sensor 834 detects the presence of a user's body (e.g., the user's face) and provides this information to an application program stored within one of the memory components 804 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some configurations, output from the accelerometer 836 is used by an application program as an input mechanism to control some functionality of the application program. In some configurations, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some configurations, output from the gyroscope 838 is used by an application program as an input mechanism to control some functionality of the application program. For example, the gyroscope 838 can be used for accurate recognition of movement within a 3D environment of a video game application or some other application. In some configurations, an application program utilizes output from the gyroscope 838 and the accelerometer 836 to enhance user input operations. Other uses of the gyroscope 838 are contemplated.

The GPS sensor 840 is configured to receive signals from GPS satellites for use in calculating a location. The location calculated by the GPS sensor 840 can be used by any application program that requires or benefits from location information. For example, the location calculated by the GPS sensor 840 can be used with a navigation application program to provide directions from the location to a destination or directions from the destination to the location. Moreover, the GPS sensor 840 can be used to provide location information to an external location-based service, such as E911 service. The GPS sensor 840 can obtain location information generated via WI-FI, WIMAX, and/or cellular triangulation techniques utilizing one or more of the network connectivity components 806 to aid the GPS sensor 840 in obtaining a location fix. The GPS sensor 840 can also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some configurations, the display 842 and the touchscreen 844 are combined. In some configurations two or more of the data I/O component 846, the audio I/O component 848, and the video I/O component 850 are combined. The I/O components 810 can include discrete processors configured to support the various interfaces described below or might include processing functionality built-in to the processor 802.

The display 842 is an output device configured to present information in a visual form. In particular, the display 842 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 842 is a liquid crystal display ("LCD") utilizing any active or passive matrix technology and any backlighting technology (if used). In some configurations, the display 842 is an organic light emitting diode ("OLED") display. Other display types are contemplated.

The touchscreen 844 is an input device configured to detect the presence and location of a touch. The touchscreen 844 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 844 is incorporated on top of the display 842 as a transparent layer to enable a user to use one or more touches to interact with objects or other information presented on the display 842. In other configurations, the touchscreen 844 is a touch pad incorporated on a surface of the computing device that does not include the display 842. For example, the computing device can have a touchscreen incorporated on top of the display 842 and a touch pad on a surface opposite the display 842.

In some configurations, the touchscreen 844 is a single-touch touchscreen. In other configurations, the touchscreen 844 is a multi-touch touchscreen. In some configurations, the touchscreen 844 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 844. As such, a developer can create gestures that are specific to a particular application program.

In some configurations, the touchscreen 844 supports a tap gesture in which a user taps the touchscreen 844 once on an item presented on the display 842. The tap gesture can be used for various reasons including, but not limited to, opening or launching whatever the user taps, such as a graphical icon. In some configurations, the touchscreen 844 supports a double tap gesture in which a user taps the touchscreen 844 twice on an item presented on the display 842. The double tap gesture can be used for various reasons including, but not limited to, zooming in or zooming out in stages. In some configurations, the touchscreen 844 supports a tap and hold gesture in which a user taps the touchscreen 844 and maintains contact for at least a pre-defined time. The tap and hold gesture can be used for various reasons including, but not limited to, opening a context-specific menu.

In some configurations, the touchscreen 844 supports a pan gesture in which a user places a finger on the touchscreen 844 and maintains contact with the touchscreen 844 while moving the finger on the touchscreen 844. The pan gesture can be used for various reasons including, but not limited to, moving through screens, images, or menus at a controlled rate. Multiple finger pan gestures are also contemplated. In some configurations, the touchscreen 844 supports a flick gesture in which a user swipes a finger in the direction the user wants the screen to move. The flick gesture can be used for various reasons including, but not limited to, scrolling horizontally or vertically through menus or pages. In some configurations, the touchscreen 844 supports a pinch and stretch gesture in which a user makes a pinching motion with two fingers (e.g., thumb and forefinger) on the touchscreen 844 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 844. As such, the above gestures should be understood as being illustrative and should not be construed as being limiting in any way.

The data I/O interface component 846 is configured to facilitate input of data to the computing device and output of data from the computing device. In some configurations, the data I/O interface component 846 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 848 is configured to provide audio input and/or output capabilities to the computing device. In some configurations, the audio I/O interface component 848 includes a microphone configured to collect audio signals. In some configurations, the audio I/O interface component 848 includes a headphone jack configured to provide connectivity for headphones or other external speakers. In some configurations, the audio interface component 848 includes a speaker for the output of audio signals. In some configurations, the audio I/O interface component 848 includes an optical audio cable out.

The video I/O interface component 850 is configured to provide video input and/or output capabilities to the computing device. In some configurations, the video I/O interface component 850 includes a video connector configured to receive video as input from another device (e.g., a video media player such as a DVD or BLU-RAY player) or send video as output to another device (e.g., a monitor, a television, or some other external display). In some configurations, the video I/O interface component 850 includes a High-Definition Multimedia Interface ("HDMI"), mini-HDMI, micro-HDMI, DisplayPort, or proprietary connector to input/output video content. In some configurations, the video I/O interface component 850 or portions thereof is combined with the audio I/O interface component 848 or portions thereof.

The camera 852 can be configured to capture still images and/or video. The camera 852 can utilize a charge coupled device ("CCD") or a complementary metal oxide semiconductor ("CMOS") image sensor to capture images. In some configurations, the camera 852 includes a flash to aid in taking pictures in low-light environments. Settings for the camera 852 can be implemented as hardware or software buttons.

Although not illustrated, one or more hardware buttons can also be included in the computing device architecture 800. The hardware buttons can be used for controlling some operational aspect of the computing device. The hardware buttons can be dedicated buttons or multi-use buttons. The hardware buttons can be mechanical or sensor-based.

The illustrated power components 812 include one or more batteries 854, which can be connected to a battery gauge 856. The batteries 854 can be rechargeable or disposable. Rechargeable battery types include, but are not limited to, lithium polymer, lithium ion, nickel cadmium, and nickel metal hydride. Each of the batteries 854 can be made of one or more cells.

The battery gauge 856 can be configured to measure battery parameters such as current, voltage, and temperature. In some configurations, the battery gauge 856 is configured to measure the effect of a battery's discharge rate, temperature, age and other factors to predict remaining life within a certain percentage of error. In some configurations, the battery gauge 856 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 812 can also include a power connector (not shown), which can be combined with one or more of the aforementioned I/O components 810. The power components 812 can interface with an external power system or charging equipment via a power I/O component 810. Other configurations can also be utilized.

The disclosure presented herein also encompasses the subject matter set forth in the following clauses:

Clause 1. A method for session control of a client-side native application using a browser client for an authentication process, the method comprising: in a proxy service: receiving an authentication request from a browser client, analyzing the authentication request to detect a native application redirect Universal Resource Locator (URL) redirecting to a native application, if the native application redirect URL is detected, modifying the native application redirect URL to a modified URL that redirects to a policy endpoint, where the modified URL incorporates the native application redirect URL, and returning the authentication request to the browser client with the modified URL; and in the policy endpoint: receiving from the browser client a redirected authentication request with the modified URL, applying one or more predefined policy rules to the native application corresponding to the native application redirect URL incorporated in the modified URL and the browser client to determine whether the native application and the browser client is allowed or prohibited, if the native application and the browser client are allowed, restoring the native application redirect URL in the authentication request and redirecting the authentication request to an identity provider for authentication, and if the native application and the browser client are prohibited, sending a failure indication to the browser client.

Clause 2. The computer-implemented method of Clause 1, where the method includes: in the proxy service: injecting browser detection code into the authentication request to be returned to the browser client with the modified URL, where the browser detection code is configured to scan the browser client to determine a type of the browser client and send browser data relating to the type of the browser client to the policy endpoint; and in the policy endpoint receiving the browser data relating to the type of the browser client, and the step of applying one or more predefined policy rules to the native application corresponding to the native application redirect URL incorporated in the modified URL and the browser client to determine whether the native application and the browser client is allowed or prohibited comprises applying the one or more predefined policy rules to the native application corresponding to the native application redirect URL incorporated in the modified URL and the browser client and the browser data to determine whether the native application and the browser client is allowed or prohibited.

Clause 3. The computer-implemented method of Clause 2, where the browser detection code is configured to scan the browser client to determine a type of the browser client by checking settings of the browser client for one or more of a standalone property of a navigation object, a window.statusbar.visible property and a window.webkit property.

Clause 4. The computer-implemented method of Clause 1, where the authentication process comprises a Single-Sign-On (SSO) authentication process.

Clause 5. The computer-implemented method of Clause 1, where: redirecting the authentication request to an identity provider comprises bypassing the authentication request by sending a Hyper Text Transfer Protocol (HTTP) message with a status code 302 to the browser client.

Clause 6. The computer-implemented method of Clause 1, where the failure indication sent to the browser client comprises at least one of an HTTP message with a status code 403 and a Hyper Text Markup Language (HTML) page configured to display a failure message to a user.

Clause 7. The computer-implemented method of Clause 1, where the authentication request comprises one of a login request from the browser client and an authentication response from the identity provider responsive to the login request from the browser client.

Clause 8. A proxy system for session control of a client-side native application using a browser client for an authentication process, the system comprising: one or more processors; and one or more memory devices in communication with the one or more processors, the memory devices having computer-readable instructions stored thereupon that, when executed by the processors, cause the processors to perform a method comprising: receiving an authentication request from a browser client; analyzing the authentication request to detect a native application redirect Universal Resource Locator (URL) redirecting to a native application; if the native application redirect URL is detected, modifying the native application redirect URL to a modified URL that redirects to a policy endpoint, where the modified URL incorporates the native application redirect URL; and returning the authentication request to the browser client with the modified URL.

Clause 9. The proxy system of Clause 8, where the method includes: injecting browser detection code into the authentication request to be returned to the browser client with the modified URL, where the browser detection code is configured to scan the browser client to determine a type of the browser client and send browser data relating to the type of the browser client to the policy endpoint.

Clause 10. The proxy system of Clause 9, where the browser detection code is configured to scan the browser client to determine a type of the browser client by checking settings of the browser client for one or more of a standalone property of a navigation object, a window.statusbar.visible property and a window.webkit property.

Clause 11. The proxy system of Clause 9, where the authentication request to be returned to the browser client with the modified URL is configured to cause the browser client to generate an auto submitted form that includes the authentication request and the browser data from the browser detection code and the auto submitted form is configured to be sent to the policy endpoint.

Clause 12. The proxy system of Clause 8, where the authentication process comprises a Single-Sign-On (SSO) authentication process.

Clause 13. The proxy system of Clause 8, where the authentication request comprises one of a login request from the browser client and an authentication response from the identity provider responsive to the login request from the browser client.

Clause 14. One or more computer storage media having computer executable instructions stored thereon which, when executed by one or more processors, cause the processors to execute a method for session control of a client-side native application that utilizes a browser client for an authentication process, the method comprising: in a proxy service: receiving an authentication request from a browser client, analyzing the authentication request to detect a native application redirect Universal Resource Locator (URL) redirecting to a native application, if the native application redirect URL is detected, modifying the native application redirect URL to a modified URL that redirects to a policy endpoint, where the modified URL incorporates the native application redirect URL, and returning the authentication request to the browser client with the modified URL; and in the policy endpoint: receiving from the browser client a redirected authentication request with the modified URL, applying one or more predefined policy rules to the native application corresponding to the native application redirect URL incorporated in the modified URL and the browser client to determine whether the native application and the browser client is allowed or prohibited, if the native application and the browser client are allowed, restoring the native application redirect URL in the authentication request and redirecting the authentication request to an identity provider for authentication, and if the native application and the browser client are prohibited, sending a failure indication to the browser client.

Clause 15. The one or more computer storage media of Clause 14, where the method includes: in the proxy service: injecting browser detection code into the authentication request to be returned to the browser client with the modified URL, where the browser detection code is configured to scan the browser client to determine a type of the browser client and send browser data relating to the type of the browser client to the policy endpoint; and in the policy endpoint receiving the browser data relating to the type of the browser client, and the step of applying one or more predefined policy rules to the native application corresponding to the native application redirect URL incorporated in the modified URL and the browser client to determine whether the native application and the browser client is allowed or prohibited comprises applying the one or more predefined policy rules to the native application corresponding to the native application redirect URL incorporated in the modified URL and the browser client and the browser data to determine whether the native application and the browser client is allowed or prohibited.

Clause 16. The one or more computer storage media of Clause 15, where the browser detection code is configured to scan the browser client to determine a type of the browser client by checking settings of the browser client for one or more of a standalone property of a navigation object, a window.statusbar.visible property and a window.webkit property.

Clause 17. The one or more computer storage media of Clause 14, where the authentication process comprises a Single-Sign-On (SSO) authentication process.

Clause 18. The one or more computer storage media of Clause 14, where: redirecting the authentication request to an identity provider comprises bypassing the authentication request by sending a Hyper Text Transfer Protocol (HTTP) message with a status code 302 to the browser client.

Clause 19. The one or more computer storage media of Clause 14, where the failure indication sent to the browser client comprises at least one of an HTTP message with a status code 403 and a Hyper Text Markup Language (HTML) page configured to display a failure message to a user.

Clause 20. The one or more computer storage media of Clause 14, where the authentication request comprises one of a login request from the browser client and an authentication response from the identity provider responsive to the login request from the browser client.

Based on the foregoing, it should be appreciated that the disclosed technology enables session control in a proxy service for client-side native applications utilizing a browser client for login, which improves security by preventing access where the native application entails risk or the combination of the native application and browser client presents risk.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A method for session control of a client-side native application using a browser client for an authentication process, the method comprising:
    in a proxy service:
        receiving an authentication request from a browser client,
        analyzing the authentication request to detect a native application redirect Universal Resource Locator (URL) redirecting to a native application,
        if the native application redirect URL is detected, modifying the native application redirect URL to a modified URL that redirects to a policy endpoint, where the modified URL incorporates the native application redirect URL, and
        returning the authentication request to the browser client with the modified URL; and
    in the policy endpoint:
        receiving from the browser client a redirected authentication request with the modified URL,
        applying one or more predefined policy rules to the native application corresponding to the native application redirect URL incorporated in the modified URL and the browser client to determine whether the native application and the browser client is allowed or prohibited,
        if the native application and the browser client are allowed, restoring the native application redirect URL in the authentication request and redirecting the authentication request to an identity provider for authentication, and
        if the native application and the browser client are prohibited, sending a failure indication to the browser client.

2. The computer-implemented method of claim 1, where the method includes:
    in the proxy service:
        injecting browser detection code into the authentication request to be returned to the browser client with the modified URL, where the browser detection code is configured to scan the browser client to determine a type of the browser client and send browser data relating to the type of the browser client to the policy endpoint; and
    in the policy endpoint
        receiving the browser data relating to the type of the browser client, and
        the step of applying one or more predefined policy rules to the native application corresponding to the native application redirect URL incorporated in the modified URL and the browser client to determine whether the native application and the browser client is allowed or prohibited comprises applying the one or more predefined policy rules to the native application corresponding to the native application redirect URL incorporated in the modified URL and the browser client and the browser data to determine whether the native application and the browser client is allowed or prohibited.

3. The computer-implemented method of claim 2, where the browser detection code is configured to scan the browser client to determine a type of the browser client by checking settings of the browser client for one or more of a standalone property of a navigation object, a window.statusbar.visible property and a window.webkit property.

4. The computer-implemented method of claim 1, where the authentication process comprises a Single-Sign-On (SSO) authentication process.

5. The computer-implemented method of claim 1, where:
    redirecting the authentication request to an identity provider comprises bypassing the authentication request by sending a Hyper Text Transfer Protocol (HTTP) message with a status code 302 to the browser client.

6. The computer-implemented method of claim 1, where the failure indication sent to the browser client comprises at least one of an HTTP message with a status code 403 and a Hyper Text Markup Language (HTML) page configured to display a failure message to a user.

7. The computer-implemented method of claim 1, where the authentication request comprises one of a login request from the browser client and an authentication response from the identity provider responsive to the login request from the browser client.

8. A proxy system for session control of a client-side native application using a browser client for an authentication process, the system comprising:
    one or more processors; and
    one or more memory devices in communication with the one or more processors, the memory devices having computer-readable instructions stored thereupon that, when executed by the processors, cause the processors to perform a method comprising:
receiving an authentication request from a browser client;
analyzing the authentication request to detect a native application redirect Universal Resource Locator (URL) redirecting to a native application;
if the native application redirect URL is detected, modifying the native application redirect URL to a modified URL that redirects to a policy endpoint, where the modified URL incorporates the native application redirect URL; and
returning the authentication request to the browser client with the modified URL.

9. The proxy system of claim 8, where the method includes:
injecting browser detection code into the authentication request to be returned to the browser client with the modified URL, where the browser detection code is configured to scan the browser client to determine a type of the browser client and send browser data relating to the type of the browser client to the policy endpoint.

10. The proxy system of claim 9, where the browser detection code is configured to scan the browser client to determine a type of the browser client by checking settings of the browser client for one or more of a standalone property of a navigation object, a window.statusbar.visible property and a window.webkit property.

11. The proxy system of claim 9, where the authentication request to be returned to the browser client with the modified URL is configured to cause the browser client to generate an auto submitted form that includes the authentication request and the browser data from the browser detection code and the auto submitted form is configured to be sent to the policy endpoint.

12. The proxy system of claim 8, where the authentication process comprises a Single-Sign-On (SSO) authentication process.

13. The proxy system of claim 8, where the authentication request comprises one of a login request from the browser client and an authentication response from the identity provider responsive to the login request from the browser client.

14. One or more computer storage media having computer executable instructions stored thereon which, when executed by one or more processors, cause the processors to execute a method for session control of a client-side native application that utilizes a browser client for an authentication process, the method comprising:
in a proxy service:
receiving an authentication request from a browser client,
analyzing the authentication request to detect a native application redirect Universal Resource Locator (URL) redirecting to a native application,
if the native application redirect URL is detected, modifying the native application redirect URL to a modified URL that redirects to a policy endpoint, where the modified URL incorporates the native application redirect URL, and
returning the authentication request to the browser client with the modified URL; and
in the policy endpoint:
receiving from the browser client a redirected authentication request with the modified URL,
applying one or more predefined policy rules to the native application corresponding to the native application redirect URL incorporated in the modified URL and the browser client to determine whether the native application and the browser client is allowed or prohibited,
if the native application and the browser client are allowed, restoring the native application redirect URL in the authentication request and redirecting the authentication request to an identity provider for authentication, and
if the native application and the browser client are prohibited, sending a failure indication to the browser client.

15. The one or more computer storage media of claim 14, where the method includes:
in the proxy service:
injecting browser detection code into the authentication request to be returned to the browser client with the modified URL, where the browser detection code is configured to scan the browser client to determine a type of the browser client and send browser data relating to the type of the browser client to the policy endpoint; and
in the policy endpoint
receiving the browser data relating to the type of the browser client, and
the step of applying one or more predefined policy rules to the native application corresponding to the native application redirect URL incorporated in the modified URL and the browser client to determine whether the native application and the browser client is allowed or prohibited comprises applying the one or more predefined policy rules to the native application corresponding to the native application redirect URL incorporated in the modified URL and the browser client and the browser data to determine whether the native application and the browser client is allowed or prohibited.

16. The one or more computer storage media of claim 15, where the browser detection code is configured to scan the browser client to determine a type of the browser client by checking settings of the browser client for one or more of a standalone property of a navigation object, a window.statusbar.visible property and a window.webkit property.

17. The one or more computer storage media of claim 14, where the authentication process comprises a Single-Sign-On (SSO) authentication process.

18. The one or more computer storage media of claim 14, where:
redirecting the authentication request to an identity provider comprises bypassing the authentication request by sending a Hyper Text Transfer Protocol (HTTP) message with a status code 302 to the browser client.

19. The one or more computer storage media of claim 14, where the failure indication sent to the browser client comprises at least one of an HTTP message with a status code 403 and a Hyper Text Markup Language (HTML) page configured to display a failure message to a user.

20. The one or more computer storage media of claim 14, where the authentication request comprises one of a login request from the browser client and an authentication response from the identity provider responsive to the login request from the browser client.

* * * * *